United States Patent
Yaguchi et al.

(10) Patent No.: US 12,385,558 B2
(45) Date of Patent: Aug. 12, 2025

(54) VARIABLE CHARACTERISTIC LIMITED-SLIP DIFFERENTIAL

(71) Applicants: GKN Automotive Limited, Birmingham (GB); TOYOTA JIDOSHA KABUSHIKI KAISHA, Aichi-ken (JP)

(72) Inventors: Yuu Yaguchi, Tochigi (JP); Takahiro Nagaoka, Tochigi (JP); Shinichiro Ishikawa, Aichi-Ken (JP); Koji Takaira, Aichi-Ken (JP)

(73) Assignees: GKN Automotive Limited, Birmingham (GB); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/925,515

(22) Filed: Oct. 24, 2024

(65) Prior Publication Data

US 2025/0052309 A1    Feb. 13, 2025

Related U.S. Application Data

(63) Continuation of application No. PCT/JP2022/018927, filed on Apr. 26, 2022.

(51) Int. Cl.
*F16H 48/34*    (2012.01)
*F16H 48/22*    (2006.01)
(Continued)

(52) U.S. Cl.
CPC ............. *F16H 48/34* (2013.01); *F16H 48/22* (2013.01); *F16H 48/08* (2013.01); *F16H 2048/204* (2013.01)

(58) Field of Classification Search
CPC ..... F16H 48/34; F16H 48/22; F16D 2023/123
See application file for complete search history.

(56) References Cited

U.S. PATENT DOCUMENTS

| 5,456,641 A | 10/1995 | Sawase | |
|---|---|---|---|
| 6,398,686 B1 * | 6/2002 | Irwin | F16H 48/295 192/93 A |

(Continued)

FOREIGN PATENT DOCUMENTS

| DE | 102022112666 A1 * | 12/2022 | ............ B60K 17/02 |
|---|---|---|---|
| JP | H05073340 U | 10/1993 | |

(Continued)

OTHER PUBLICATIONS

Written Opinion & International Search Report for PCT/JP2022/018927 dated Jul. 19, 2022, (9 pages).

(Continued)

*Primary Examiner* — Stacey A Fluhart
(74) *Attorney, Agent, or Firm* — Reising Ethington P.C.

(57) ABSTRACT

A differential used for distributing input torque, is provided with: a casing to receive the input torque; a differential gear set supported by the casing for differentially distribute the input torque to first and second side gears; a clutch interposed between the casing and the first side gear to limit differential motion between the first side gear and the second side gear; an actuator to exert a pressure force on the clutch to control the differential motion; and an electronic control unit configured to calculate a locking rate from a selected differential torque ratio, calculate a requesting torque from a product as a result of multiplying the input torque by the locking rate, and control an electric power to be input to the actuator on the basis of the requesting torque.

7 Claims, 6 Drawing Sheets

(51) Int. Cl.
*F16H 48/08* (2006.01)
*F16H 48/20* (2012.01)

(56) References Cited

U.S. PATENT DOCUMENTS

| | | | |
|---|---|---|---|
| 6,561,939 B1* | 5/2003 | Knapke | F16H 48/22 |
| | | | 192/84.6 |
| 6,837,821 B2* | 1/2005 | Teraoka | F16H 48/30 |
| | | | 475/233 |
| 2003/0121750 A1* | 7/2003 | Teraoka | F16H 48/22 |
| | | | 192/93 A |
| 2003/0232683 A1 | 12/2003 | Teraoka et al. | |
| 2012/0053002 A1 | 3/2012 | Schmidt et al. | |
| 2016/0193915 A1* | 7/2016 | Cooper | F16H 48/20 |
| | | | 475/220 |
| 2016/0238107 A1* | 8/2016 | Hirota | F16D 28/00 |
| 2017/0108103 A1* | 4/2017 | Cooper | F16H 37/0813 |
| 2021/0293316 A1 | 9/2021 | Hirota et al. | |

FOREIGN PATENT DOCUMENTS

| | | |
|---|---|---|
| JP | H05345534 A | 12/1993 |
| JP | H07233863 A | 9/1995 |
| JP | 2001039179 A | 2/2001 |
| JP | 2003329105 A | 11/2003 |
| JP | 2006183784 A | 7/2006 |
| JP | 2011079420 A | 4/2011 |
| JP | 2011131633 A | 7/2011 |
| JP | 2012512996 A | 6/2012 |
| WO | WO2010078937 A1 | 7/2010 |
| WO | WO2020129400 A1 | 6/2020 |

OTHER PUBLICATIONS

English Translation—International Search Report for PCT/JP2022/018927 dated Jul. 19, 2022, (3 pages).

* cited by examiner

VARIABLE CHARACTERISTIC LIMITED-SLIP DIFFERENTIAL

CROSS REFERENCE TO RELATED APPLICATIONS

This application is a continuation Application of PCT International Application No. PCT/JP2022/018927 filed on Apr. 26, 2022, the entire contents of which are incorporated herein by reference.

TECHNICAL FIELD

The disclosure herein relates to a limited-slip differential used for a vehicle, and to a limited-slip differential capable of varying its characteristics depending on the situation.

BACKGROUND

A differential is a commonly used device for outputting torque to a pair of shafts with allowing differential motion therebetween. The differential, when one of the shafts spins out, fails to output the torque even to the other, if it is unable to limit the differential motion. Thus the differential is often provided with a mechanism for limiting or temporarily halting the differential motion. A mechanism for limiting the differential motion by any friction means for example is frequently referred to as a limited-slip differential (LSD), and particularly the one that can change the limiting power dynamically depending on input torque is referred to as a torque-sensitive LSD. If a mechanical device controls the limiting power, that can be referred to as mechanical LSD and, instead if an electronic control unit is applied, that can be referred to as electronic LSD.

The following documents disclose related arts.
PCT International Publication WO 2010/078937
PCT International Publication WO 2020/129400 A1

SUMMARY

With a well-designed electronic LSD, because it could optimize limitation of differential motion depending on the situation, a driver without high skill could successfully control his/her vehicle even on a chaotic road. For a skillful driver, however, intervention of unintended electronic control would evoke an unnatural feeling as if the vehicle starts unpredictable actions, and may be thus obstructive to desired driving. The skillful driver may therefore prefer the mechanical LSD on the one hand, because he/she can easily grasp the vehicle's actions but, on the other hand, the mechanical LSD is inflexible about its characteristics. When different characteristics are required, replacement of the LSD is necessary.

The device disclosed hereinafter has been created in view of these problems. According to an aspect, a differential used for distributing input torque, is provided with: a casing configured to receive the input torque; a differential gear set supported by the casing and including a first and second side gears, the differential gear set being configured to differentially distribute the input torque to the first and second side gears; a clutch interposed between the casing and the first side gear to frictionally brake the first side gear relative to the casing so as to limit differential motion between the first side gear and the second side gear; an actuator configured to exert a pressure force on the clutch to control the differential motion; and an electronic control unit electrically connected to the actuator, the electronic control unit configured to calculate a locking rate from a selected differential torque ratio, calculate a requesting torque from a product as a result of multiplying the input torque by the locking rate, and control an electric power to be input to the actuator on the basis of the requesting torque.

BRIEF DESCRIPTION OF THE DRAWINGS

The following detailed description of certain embodiments and best mode will be set forth with reference to the accompanying drawings, in which.

DETAILED DESCRIPTION

Exemplary embodiments will be described hereinafter with reference to the appended drawings.

Figure 1:
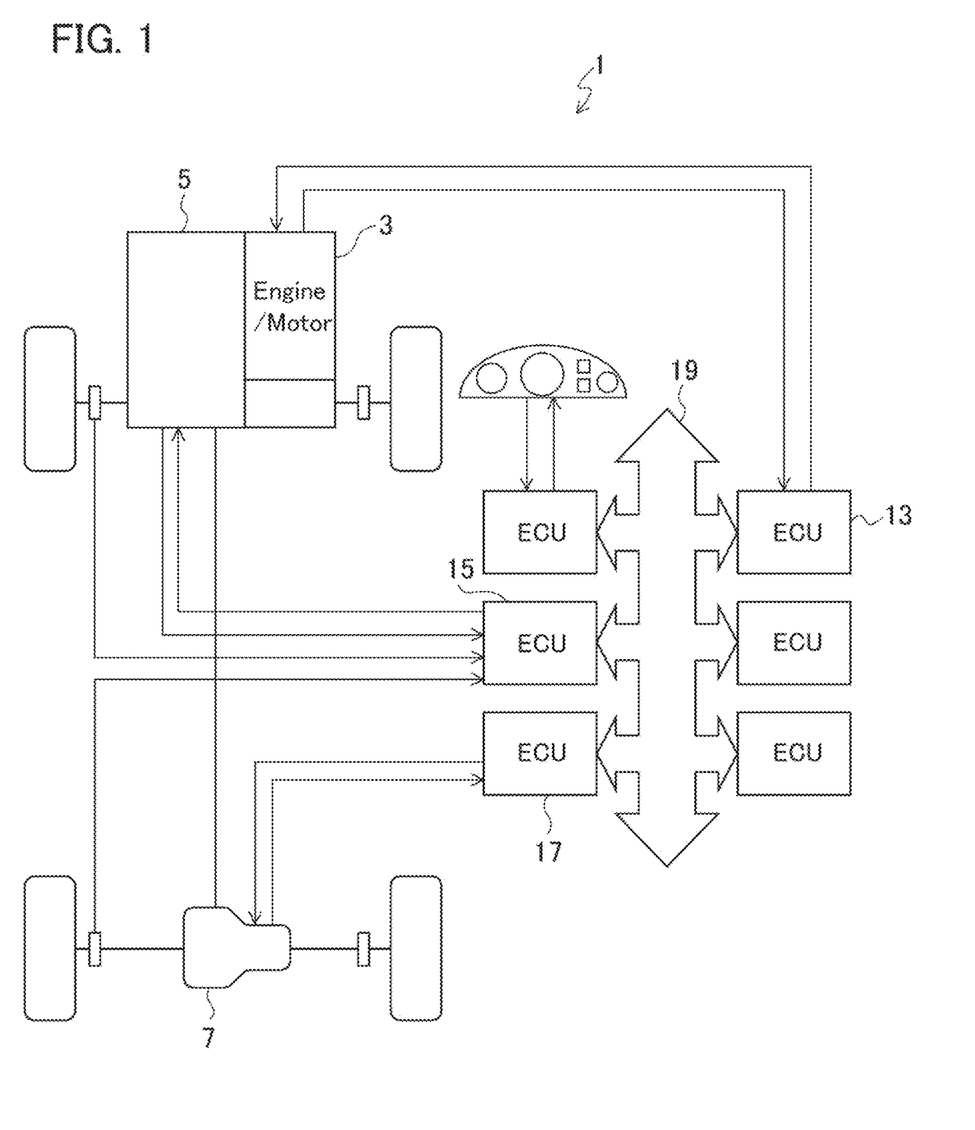
FIG. 1 is a block diagram of a vehicle including a differential according to the present embodiment.

Referring to FIG. 1, an ordinary vehicle 1 is for example provided with a power source 3 composed of an engine for example, and a gear system including a transmission 5 that transmits torque from the engine to respective axles, and is further provided with a plurality of programmable electronic control units (ECUs) so as to electronically control these respective elements.

Torque is taken out of the transmission 5, input into the differential 7, and distributed to both the driving wheels. The illustration in FIG. 1 is directed to a so-called FR vehicle which has the power source on its front part and is driven by the rear wheels, and the differential 7 is interposed between the propeller shaft and the rear axles and used for distributing the torque to these axles. The LSD according to the present embodiment is of course not limited to the FR vehicle but is also applicable to any vehicles including an FF vehicle, an MR vehicle and an all-wheel driving vehicle. As well, in a case where the vehicle is provided with a plurality of differentials, the LSD according to the present embodiment is applicable to not one but two or more of these differentials, and is also used for output to not only the axles but also any arbitrary shafts.

Each ECU is provided with a storage unit storing commands and data and a microcontroller capable of reading out them and executing the commands. The number of ECUs that an ordinary vehicle has could reach several tens or more, but FIG. 1 merely shows only 6 ECUs thereof. These ECUs 11-17 read out states of the respective elements on the vehicle and are mutually connected via a bus 19. The ECUs 11-17 mutually communicate or share information by communication through a so-called controller area network (CAN) for example. The information contains not only the read-out states but also requests for other ECUs and the respective ECUs thereby control the respective elements on the vehicle.

The ECU 13 for example reads out and controls the torque generated by the power source 3, the ECU 15 reads out and controls the states of the transmission. The ECU 17 similarly controls the differential 7 and as well receives information of the torque generated by the power source 3 for example through CAN communication via the bus 19 to use the information for performing its control. Of course, the receiving and sending information is not limited to the torque.

Figure 2:
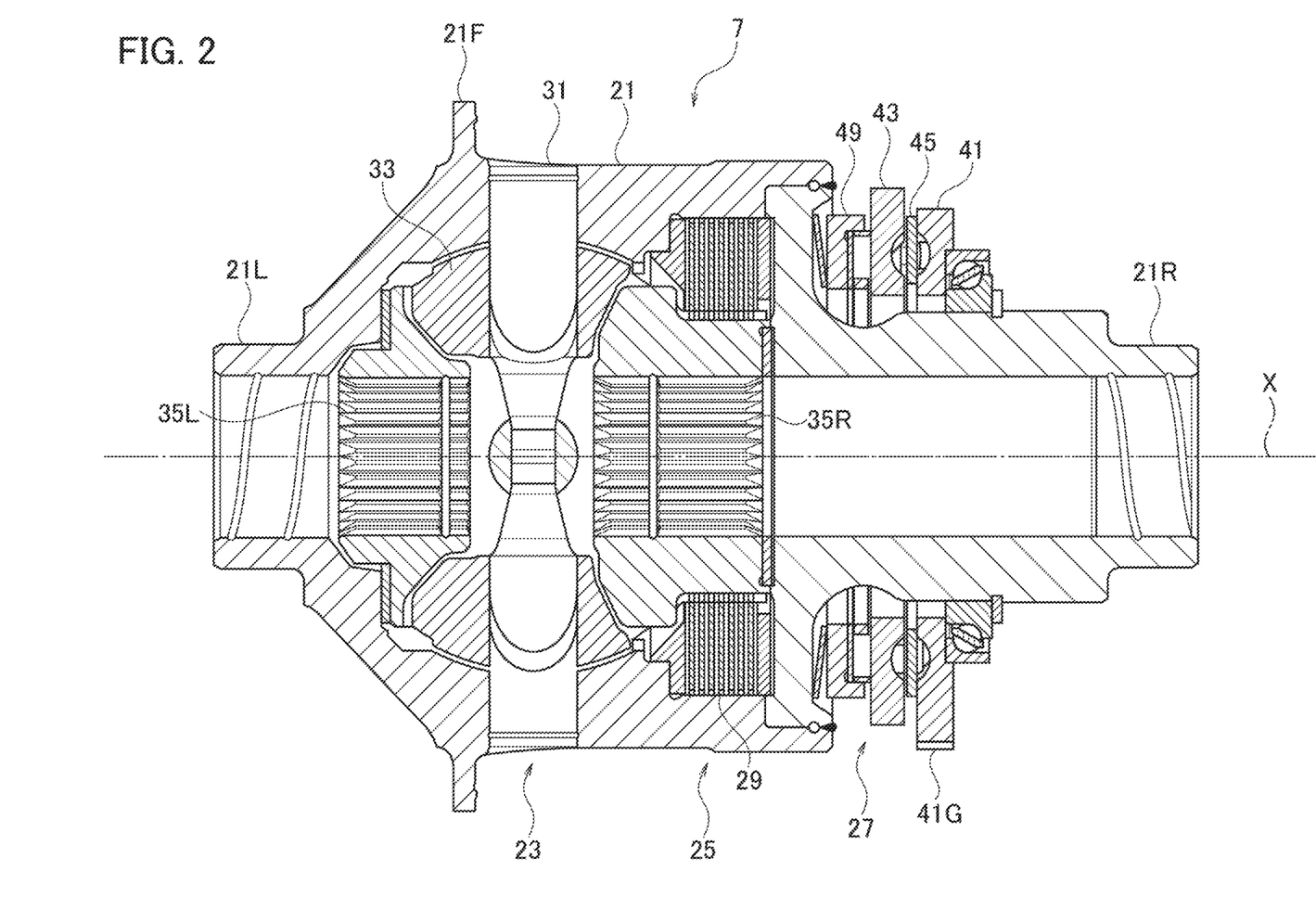
FIG. 2 is a sectional elevational of the differential.

Referring to FIG. 2, any general electronically-controlled limited-slip differential (LSD) is applicable to the differential 7. Specifically, the differential 7 is, just as an example only, provided with a casing 21 rotatable about an axis X, a differential gear set 23 housed in the casing 21, a friction clutch 25 for limiting differential motion of the differential gear set 23, and an actuator 27 for exerting a pressure force on the clutch 25. The ECU 17 mainly controls the actuator 27.

Although the following description is directed to an example in which a differential gear set of a bevel gear type is applied to the differential 7, of course a face-gear type, a planetary gear type or any other type is instead applicable. While the description is also directed to an example in which a multi-plate clutch is applied to the friction clutch, a cone clutch or any other clutch is instead applicable. Further, in the described example, the actuator uses a gear-cam mechanism driven by an external motor, whereas a motor may be internally furnished to directly, without gears, drive a rotary plate, or what utilizes a hydraulic system or such to create a thrust force without a cam mechanism may be used, or any other proper type is applicable.

Figure 3:
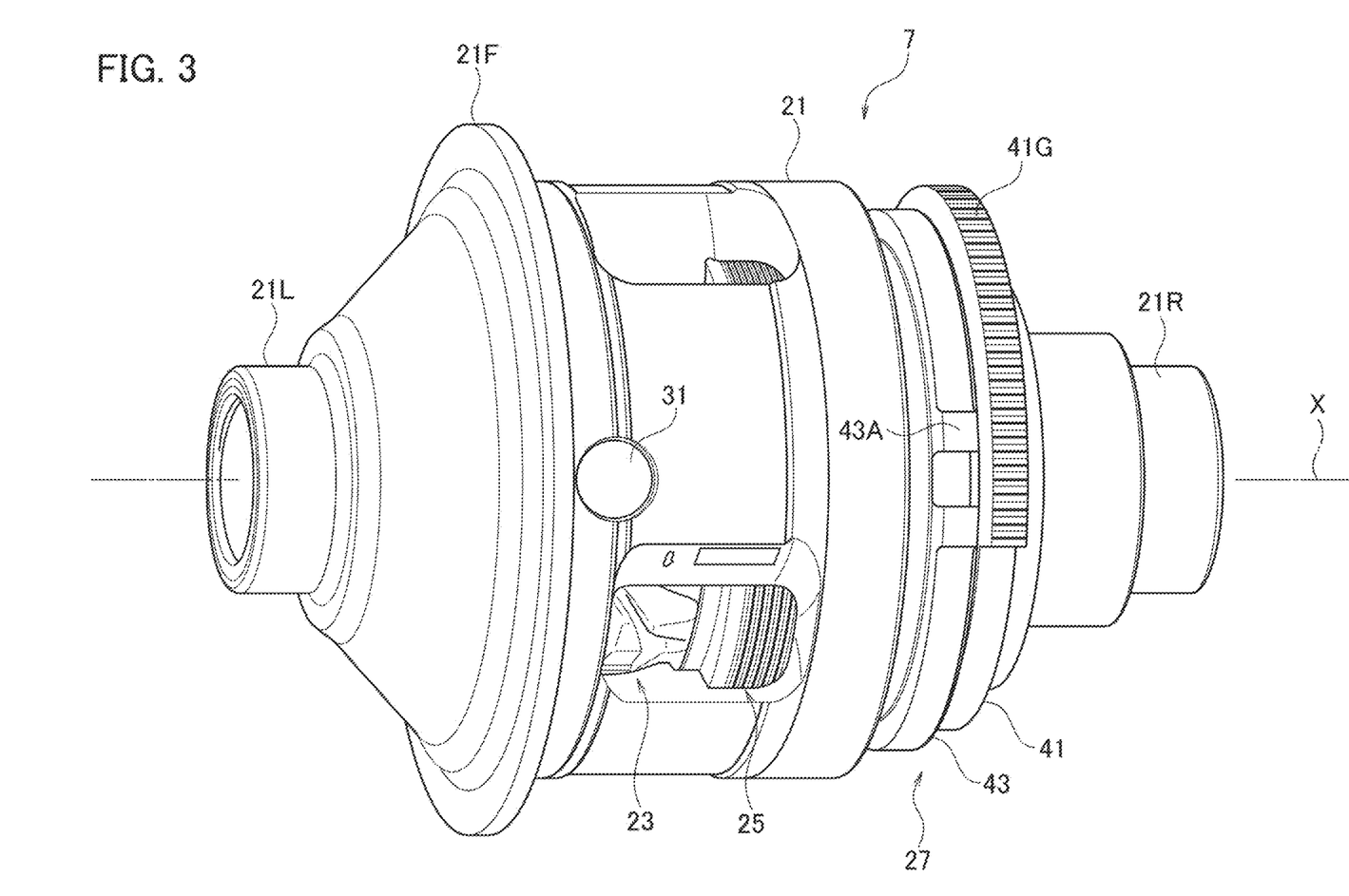
FIG. 3 is a perspective view of the differential.

Referring to FIG. 3 in combination with FIG. 2, from both ends of the casing 21, boss portions 21R, 21L project axially and are, by being supported by a carrier with interposed bearings such as ball bearings, rotatable about the axis X. From an outer periphery of the casing 21, a flange 21F extends radially and serves for fixation with a ring gear for example. As a propeller shaft at its end has a gear corresponding to the ring gear, through mutual meshing thereof, the casing 21 receives the torque from the power source 3.

The differential gear set 23 is for example provided with a pinion shaft 31 secured to the casing 21, pinions 33 rotatable about it, and side gears 35R, 35L respectively in mesh with the pinions 33. The side gears 35R, 35L are respectively provided with splines for example on these inner peripheries, which are respectively connected to output shafts. The output shafts are in general right and left axles. As will be readily understood, the side gears 35R, 35L are capable of getting in differential motion relative to each other and therefore the differential gear set 23 distributes the torque received from the casing 21 to the side gears 35R, 35L with allowing differential motion therebetween and thereby outputs the torque to both the axles.

The clutch 25 is a multi-plate clutch for example and is provided with a plate group 29 of inner plates and outer plates layered alternately and interposed between the casing 21 and the right side gear 35R for example. The side gear 35R for example is provided with lugs for engaging and inner plates are provided with corresponding grooves, thereby these elements are mutually in mesh. An inner periphery of the casing 21 is similarly provided with lugs, with which the outer plates are in mesh. When the actuator 27 applies pressure onto the plate group 29, the clutch 25 frictionally brakes the right side gear 35R relative to the casing 21 so as to limit differential motion between the side gears 35R, 35L. Needless to say, the clutch 25 may brake the left side gear 35L in place of the right side gear 35R.

The actuator 27 is for example provided with a rotary plate 41, a support plate 43 and a cam mechanism 45 interposed therebetween to create thrust force. The rotary plate 41 is rotatable about the axis X for example and is, on its outer periphery, provided with gear teeth 41G. Although not shown in FIGS. 2, 3, the actuator 27 is further provided with a motor for driving the same, which rotates the rotary plate 41 as its shaft is in mesh with the gear teeth 41G. The support plate 43 lies adjacent to the rotary plate 41 and is provided with a structure 43A for preventing rotation, which is engaged with the carrier to prevent the support plate from rotating. The cam mechanism 45 is for example provided with cam slopes oblique relative to the circumferential direction, which are formed on one or both of the plates 41, 43, and cam balls rolling on these slopes. When the rotary plate 41 rotates relative to the support plate 43, the cam balls roll to climb up or fall down the slopes so that the cam mechanism 45 converts the rotative force into the thrust force.

The actuator 27 is disposed close to the clutch 25 so as to exert the thrust force on the clutch 25 and is further disposed close to an end wall of the casing 21. The actuator 27 may be provided with a plunger 49 for outputting the thrust force and, although may be less comprehensible from the drawing, the plunger 49 passes through the end wall of the casing 21 to have structural communication with the clutch 25. The actuator 27 thereby exerts the thrust force on the clutch 25 in accordance with the angle of rotation given by the motor.

Needless to say, the cam mechanism is not necessary to utilize cam balls and may instead use any structure capable of converting the rotative force into the thrust force. While the support plate 43 exerts the thrust force in the illustrated example, instead the rotary plate 41 may exert the thrust force.

By the actuator 27 as structured in a way described above, the thrust force in accordance with the angle of rotation of the rotary plate 41 acts on the clutch 25. As the angle of rotation increases from its initial position, normally the thrust force increases, consequently a rate of the torque transmitted through the clutch 25 to the side gears 35R, 35L (clutch torque) increases and instead a rate of the torque through the gear set 23 decreases. Conversely, when the angle of rotation of the rotary plate 41 decreases, the rate of the torque through the clutch 25 decrease and the rate of the torque through the gear set 23 increases.

The ECU 17 calculates a requesting torque in a way as described below and, based thereon, controls the actuator 27 to dynamically control the clutch torque.

Figure 4:
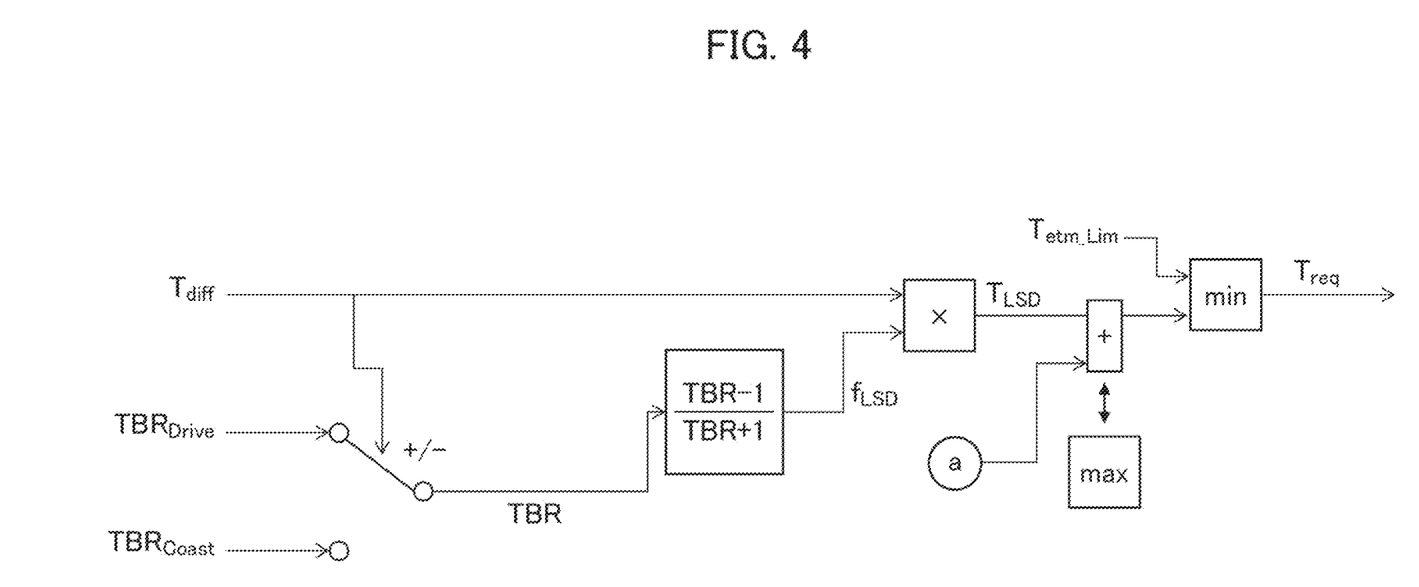
FIG. 4 is a diagram schematically illustrating arithmetic operations by an electronic control unit.

Referring mainly to FIG. 4, the extent of limitation in a torque-sensitive LSD is generally estimated by a torque bias ratio (TBR). The torque bias ratio is defined as a ratio of a torque value transmitted to a slower axle (normally, greater torque is transmitted there) to a torque value transmitted to a faster axle. A locking rate $f_{LSD}$ required to realize a target TBR is calculated by a formula (TBR−1)/(TBR+1). When a torque $T_{diff}$ is input to the differential 7, a clutch torque $T_{LSD}$ to be generated under the locking rate $f_{LSD}$ is calculated by a formula $T_{diff} \times f_{LSD}$ for example. Of course, any other formula may be instead used for obtaining $T_{LSD}$) and a formula properly selected in accordance with an actual structure of a mechanical LSD to be simulated may be used.

In a mechanical LSD, as some pressure can be applied in advance to a clutch, an initial torque $T_i$ induced thereby can be created. To simulate this pre-pressure, the sum of the clutch torque $T_{LSD}$ and an initial torque $T_i$ (an input represented by a reference sign in FIG. 4) may be set as a requesting torque $T_{req}$. Alternatively, the clutch torque $T_{LSD}$ and the initial torque $T_i$, whichever has a greater value may be adopted as the requesting torque $T_{req}$.

An upper limit value may be set to the requesting torque $T_{req}$ in order to avoid excessive input power acting on the motor, the actuator 27 and the clutch 25. For example, first a maximum value $T_{etm\_Lim}$ can be determined in advance, next the calculated requesting torque value or the maximum value $T_{etm\_Lim}$, whichever is smaller can be adopted as a renewed requesting torque $T_{req}$, thereby preventing excessive input power.

As the input torque $T_{diff}$ can be calculated or estimated from the torque generated by the power source 3, the ECU 17 can at any time fetch its value through the CAN communication. As TBR and $T_i$ can be in advance stored in the storage unit of the ECU 17, the ECU 17 can at any time calculate $T_{req}$. The ECU 17 is electrically connected to the motor and applies thereto a controlled electric power based on the calculated requesting torque value $T_{req}$ so as to at any time control the angle of rotation of the rotary plate 41, thereby dynamically controlling the clutch torque. The relation among the electric power applied to the motor, the angle of rotation of the rotary plate, and the clutch torque can be in advance stored as a form of a data table in the storage unit, and thereby the ECU 17 controls the differential 7. The resultant clutch torque sufficiently reproduces the one by a mechanical LSD having the given torque bias ratio TBR.

TBR may be changed depending on whether the vehicle is accelerating or decelerating. Whether the vehicle is accelerating or decelerating can be determined from a signed $T_{diff}$ value. Specifically, referring to the lower left-hand in FIG. 4, the forward-direction $TBR_{Drive}$ can be adopted as TBR when the signed $T_{diff}$ has a positive value, the reverse-direction $TBR_{Coast}$ can be adopted as TBR when the signed $T_{diff}$ has a negative value. Independent optimum values can be adopted respectively as the forward-direction $TBR_{Drive}$ and the reverse-direction $TBR_{Coast}$, and one example of such a set is, but not limited to, the forward-direction $TBR_{Drive}$=2.7 and the reverse-direction $TBR_{Coast}$=2.3.

While TBR and $T_i$ can be stored as constant values in the storage unit in advance, it is to be noted here that plural sets of values may be stored and any set can be selected therefrom depending on each situation. In addition, these values may be not discrete ones but continuously varied. While characteristics of a mechanical LSD are fixed at a time of being installed in a vehicle as described already, the present embodiment enables TBR and/or $T_i$ to be properly modified each time the vehicle runs or even during running, thereby changing the characteristics of the differential. Changes may be made on manual by a driver through the console or by automatic control by the other ECU. The driver can select any characteristics at will to enjoy driving.

It is to be still noted that the present embodiment enables control of the differential 7 only by using the $T_{diff}$ value that is constantly available through the CAN communication. Any additional sensors are unnecessary to control the differential 7 and as well various information such as the vehicle speed and respective rotational speeds of the axles is not required. More specifically, any conventional differential is compatibly replaceable with the differential 7 according to the present embodiment without any particular additional configuration.

Needless to say, the present embodiment is open to any additional configuration. For example, the ECU 17 may receive data of the input torque not through the CAN communication but by a sensor for itself for example, or may calculate the input torque from another information, and may then use it.

Further, any additional information other than the input torque may be used to calculate or correct the requesting torque value. Correction by so-called deviation feedback control is possible, in which control is based on a deviation calculated from a yaw rate target value and a real yaw rate value or such. Further, the control may be configured from feedforward control based on the output determined in advance by the input torque and a correction output determined in advance by a current vehicle status such as a vehicle speed and/or acceleration in order not to damage predictability of vehicle actions by a driver, and in this case delay in response by operations or sudden intervention of correction control can be suppressed.

Figure 5:
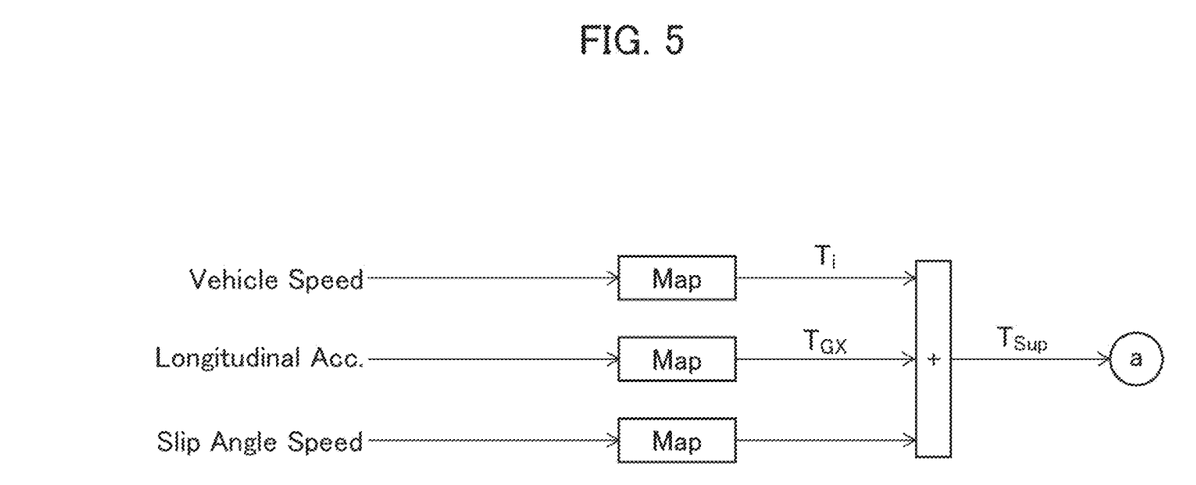
FIG. 5 is a diagram schematically illustrating an alternative method for arithmetic operations.

Referring to FIG. 5, the vehicle speed and/or the rate of acceleration (deceleration) may be for example referred to so as to correct the requiring torque value $T_{req}$. For example, the initial torque $T_i$ may be increased as the vehicle speed increases. Or, an alternative control may be possible in that the initial torque $T_i$ is made constant until the vehicle speed reaches a reference value, and $T_i$ is increased after exceeding the reference value or is again made constant when the speed reaches another reference value. Alternatively, the value may not be given a sharp change at a reference value but be controlled under a proper control curve. A data table necessary for such control may be stored in advance in the storage unit of the ECU 17. Similarly, depending on the rate of acceleration (deceleration), an additional torque Tax may be added to the initial torque $T_i$. $T_{GX}$ may be also changed in accordance with any proper reference value or any proper control curve. $T_{sup}$ as a sum of $T_i$ and $T_{GX}$ may be, in place of the initial torque, added to the formula of FIG. 4 (as a reference sign "a" in FIGS. 4 and 5).

Still further, by detecting a skid of tires, the requiring torque value $T_{req}$ may be corrected. For example, when a rotational speed difference between right and left axles is detected, the locking rate may be increased as a function of the rotational speed difference. A correction value obtained thereby may be added as the reference sign "a" to the calculation shown in FIG. 4.

Moreover, the requiring torque value $T_{req}$ may be corrected as a function of the accelerator position. For example, a control is possible, in which the locking rate is increased to increase traction when the accelerator position is thrusted down. Correction values, as a function of the output from the accelerator position sensor for example, may be stored as a data table in the storage unit of the ECU 17 and may be used to change the forward-direction $TBR_{Drive}$ in accordance with the data table.

These corrections are beneficial to prevention of a tight-corner braking phenomenon for example.

Of course, any other information such as rotation speeds of the respective axles, a steering angle, a yaw rate, a lateral acceleration rate, a sideslip angle, and a sideslip speed may be supplementarily, additionally or alternatively used to calculate or correct the requiring torque value.

The calculated requiring torque value $T_{req}$ may be further passed through a proper filter. By using a low-pass filter for example, any sudden change in behavior of a vehicle at rise and fall of the clutch torque can be effectively prevented.

As the aforementioned calculations are formulaic, any discrete arithmetic circuit may be used, instead of calculation by the ECU 17. Specifically, under control by the ECU 17, an external arithmetic circuit may perform the aforementioned calculations.

Figure 6:
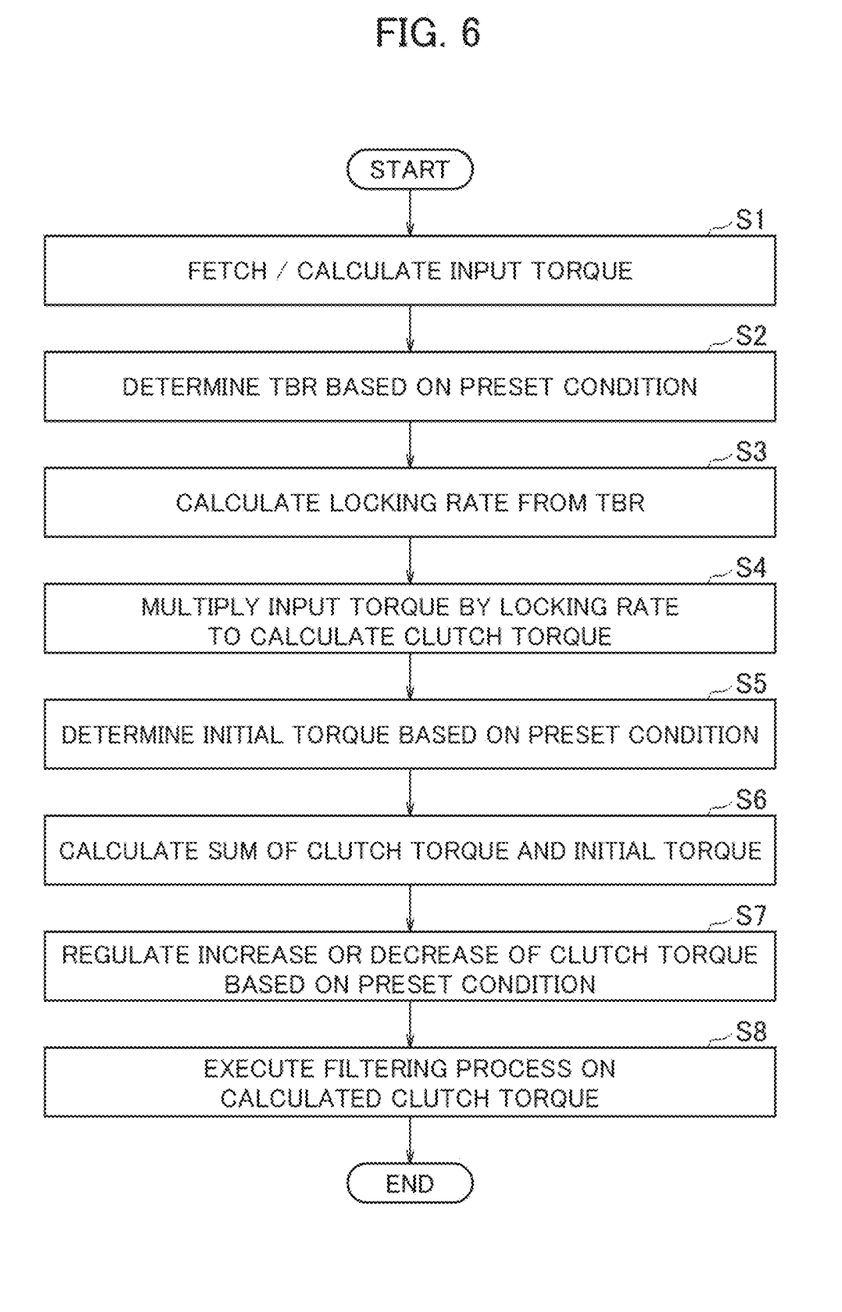
FIG. 6 is a flowchart for arithmetic operations and control performed by the electronic control unit.

A process of controlling by the ECU 17 will be described hereafter with reference to FIG. 6. The ECU 17 first uses the CAN communication to fetch or calculate the input torque (S1). The ECU 17 next determines TBR by selecting it from the data table stored in advance or in accordance with a preset condition (S2). The ECU 17 uses them to calculate the locking rate (S3) and multiply its result by the input torque to obtain the clutch torque (S4). If necessary, determining the initial torque based on the preset condition (S5) is executed and the sum of its result and the clutch torque is calculated to obtain the requiring clutch torque (S6). Here, as described already, instead of calculation of the sum, the calculated clutch torque or the initial torque, whichever is the maximum value can be adopted as the requiring clutch torque. Further if necessary, the ECU 17 corrects the requiring clutch torque (S7). Still further if necessary, the ECU 17 passes the calculated requiring clutch torque through a filter (S8). The ECU 17, in accordance with the obtained requiring clutch torque, applies electric power to the motor and thus controls the angle of rotation of the rotary plate 41, thereby dynamically controlling the clutch torque. This process would be steadily repeated.

As being understood from the above descriptions, the present embodiment can successfully let behavior of a differential approximate behavior of a conventional mechanical LSD so as to offer to a skillful driver a driving experience without strangeness. In addition, due to a nature of an electronic control, without requiring replacement of differentials, the embodiment offers a potential for arbitrarily changing various parameters without exchanging differentials and addibility of various functions as its advantage.

Although certain exemplary embodiments are described above, modifications and variations of the embodiments will occur to those skilled in the art, in light of the above teachings.

What is claimed is:

1. A differential used for distributing input torque, comprising:
   a casing configured to receive the input torque;
   a differential gear set supported by the casing and including a first and second side gears, the differential gear set being configured to differentially distribute the input torque to the first and second side gears;
   a clutch interposed between the casing and the first side gear to frictionally brake the first side gear relative to the casing so as to limit differential motion between the first side gear and the second side gear;
   an actuator configured to exert a pressure force on the clutch to control the differential motion; and
   an electronic control unit electrically connected to the actuator and including a storage unit, the electronic control unit configured to calculate a locking rate of the differential from a torque bias ratio of the differential read from the storage unit, calculate a requesting torque from a product as a result of multiplying the input torque by the locking rate, and control an electric power to be input to the actuator on the basis of the requesting torque.

2. The differential of claim 1, wherein the electronic control unit is configured to calculate a sum of the product and an initial torque and substitute the sum for the requesting torque.

3. The differential of claim 2, wherein the electronic control unit is configured to compare the sum and a limiting torque value and substitute a smaller value of the sum or the limiting torque value for the requesting torque.

4. The differential of claim 1, wherein the electronic control unit is configured only of a feed forward control by an output determined in advance by the input torque and a corrected output determined in advance by a vehicle state.

5. The differential of claim 1, wherein the storage unit stores two or more torque bias ratios and the electronic control unit is configured to select one from the stored differential torque ratios in response to a sign of the input torque.

6. The differential of claim 1, wherein the electronic control unit is connected via a network with other electronic control units and is configured to fetch the input torque via the network.

7. The differential of claim 1, wherein the actuator comprises a rotary plate driven by a motor to rotate, an anti-rotated support plate, and a cam mechanism to cause the support plate or the rotary plate to create a thrust force in response to a rotation of the rotary plate relative to the support plate, and is so disposed as to exert the thrust force on the clutch.

* * * * *